US008503100B2

(12) United States Patent
Iwasawa

(10) Patent No.: US 8,503,100 B2
(45) Date of Patent: Aug. 6, 2013

(54) COMPACT ZOOM LENS

(75) Inventor: Yoshito Iwasawa, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 299 days.

(21) Appl. No.: 12/901,688

(22) Filed: Oct. 11, 2010

(65) Prior Publication Data

US 2011/0085251 A1  Apr. 14, 2011

(30) Foreign Application Priority Data

Oct. 13, 2009 (KR) .................. 10-2009-0097438

(51) Int. Cl.
*G02B 15/14* (2006.01)
(52) U.S. Cl.
USPC ............................... 359/687; 359/683
(58) Field of Classification Search
USPC ................................. 359/687, 683
See application file for complete search history.

(56) References Cited

U.S. PATENT DOCUMENTS

| 6,101,043 | A | 8/2000 | Kohno et al. | |
| 7,692,871 | B2 * | 4/2010 | Obu et al. | 359/687 |
| 2009/0251797 | A1 * | 10/2009 | Saruwatari | 359/687 |

FOREIGN PATENT DOCUMENTS

| JP | 63-205628 A | 8/1988 |
| JP | 3391342 B2 | 1/2003 |

* cited by examiner

*Primary Examiner* — Scott J Sugarman
(74) *Attorney, Agent, or Firm* — Drinker Biddle & Reath LLP

(57) ABSTRACT

A zoom lens including: a first lens group having a positive refractive power; a second lens group having a negative refractive power; a third lens group having a positive refractive power; and a fourth lens group having a positive refractive power, wherein the first lens group, the second lens group, the third lens group, and the fourth lens group are sequentially arranged in the order from an object side to an image surface side, while zooming from a wide-angle position to a telephoto position, the first lens group is moved in such a way that the distance between the first lens group and the second lens group is widened, the second lens group is moved along a trajectory convex toward the image surface side, the third lens group is moved from the image surface side to the object side, and the fourth lens group is moved along a trajectory convex toward the object side, and the zoom lens satisfies the following inequalities:

$vd1ave > 68.2$, and $Nd1ave > 1.53$ where $vd1ave$ is the average of Abbe numbers of positive lenses belonging to the first lens group, and $Nd1ave$ is the average of refractive indexes of the positive lenses belonging to the first lens group.

21 Claims, 16 Drawing Sheets

COMPACT ZOOM LENS

CROSS-REFERENCE TO RELATED PATENT APPLICATION

This application claims the benefit of Korean Patent Application No. 10-2009-0097438, filed on Oct. 13, 2009, in the Korean Intellectual Property Office, the disclosure of which is incorporated herein in its entirety by reference.

BACKGROUND

1. Field of the Invention

The invention relates to a zoom lens having a compact structure and a high zoom magnification ratio.

2. Description of the Related Art

Recently, use of optical imaging devices, such as digital still cameras or digital camcorders, including a solid-state imaging device such as a charge-coupled device (CCD) or a complementary metal-oxide semiconductor (CMOS), each of which converts an optical image into an electrical signal, is rapidly increasing.

Thus, imaging devices having high resolution are needed. In response to such a need, imaging lenses having excellent imaging functions, in particular, zoom lenses having excellent imaging functions, are also needed. In addition, characteristics such as a wide viewing angle, portability, and a high zoom magnification ratio of 10 or more are also required for imaging devices. Thus, a variety of compact and lightweight imaging devices having high performance are being developed.

As such a zoom lens, for example, a zoom lens including first through fourth lens groups respectively having positive, negative, positive, and positive refractive powers sequentially disposed from an object side, is generally used, and optical structures that embody high zoom magnification ratios and aberration of which is easily corrected are getting more attention.

SUMMARY

An embodiment of the invention provides a zoom lens having a compact structure and a high zoom magnification ratio.

According to an embodiment of the invention, there is provided a zoom lens including: a first lens group having a positive refractive power; a second lens group having a negative refractive power; a third lens group having a positive refractive power; and a fourth lens group having a positive refractive power, wherein the first lens group, the second lens group, the third lens group, and the fourth lens group are sequentially arranged from an object side to an image surface side, while zooming from a wide-angle position to a telephoto position, the first lens group is moved in such a way that the distance between the first lens group and the second lens group is widened, the second lens group is moved along a trajectory convex toward the image surface side, the third lens group is moved from the image surface side to the object side, and the fourth lens group is moved along a trajectory convex toward the object side, and the zoom lens satisfies the following inequalities:

$$vd1\text{ave} > 68.2, \text{ and}$$

$$Nd1\text{ave} > 1.53$$

where vd1ave is the average of Abbe numbers of positive lenses belonging to the first lens group, and Nd1ave is the average of refractive indexes of the positive lenses belonging to the first lens group.

The zoom lens may further satisfy the following inequality:

$$0.85 < |\beta 2T| < 1.5$$

where $\beta 2T$ is the magnification ratio of the second lens group at the telephoto position.

The zoom lens may further satisfy the following inequality:

$$6.3 < f1/fw < 9.15$$

where f1 is the focal length of the first lens group and fw is the focal length of the zoom lens at the wide-angle position.

The zoom lens may further satisfy the following inequality:

$$0.32 < \beta 234T/fw < 0.5$$

where $\beta 234T$ is the combined magnification ratio of the second lens group, the third lens group, and the fourth lens group at the telephoto position, and fw is a focal length of the zoom lens at the wide-angle position.

The first lens group and the third lens group may satisfy the following inequality:

$$|vd1\text{ave} - vd3\text{ave}| < 9.0$$

where vd1ave is the average of Abbe numbers of positive lenses belonging to the first lens group, and vd3ave is the average of Abbe numbers of positive lenses belonging to the third lens group.

The zoom lens may satisfy the following inequality:

$$\beta 4T > 0.6$$

where $\beta 4T$ is the magnification ratio of the fourth lens group at the telephoto position.

According to another embodiment of the invention, there is provided a zoom lens including: a first lens group having a positive refractive power; a second lens group having a negative refractive power; and a third lens group having a positive refractive power, wherein the first lens group, the second lens group, and the third lens group are sequentially arranged from an object side to an image surface side, while zooming from a wide-angle position to a telephoto position, the first lens group is moved in such a way that the distance between the first lens group and the second lens group is widened, the second lens group is moved along a trajectory convex toward the image surface side, and the third lens group is moved from the image surface side to the object side, and the zoom lens satisfies the following inequalities:

$$vd1\text{ave} > 68.2,$$

$$Nd1\text{ave} > 1.53,$$

$$0.85 < |\beta 2T| < 1.5,$$

$$|vd1\text{ave} - vd3\text{ave}| < 9.0, \text{ and}$$

$$ft/fw > 11$$

where vd1ave is the average of Abbe numbers of positive lenses belonging to the first lens group, vd3ave is the average of Abbe numbers of positive lenses belonging to the third lens group, Nd1ave is the average of refractive indexes of the positive lenses belonging to the first lens group, $\beta 2T$ is the magnification ratio of the second lens group at the telephoto position, ft is the focal length of the zoom lens at the telephoto position, and fw is the focal length of the zoom lens at the wide-angle position.

According to another embodiment of the invention, there is provided a zoom lens including: a first lens group having a positive refractive power; a second lens group having a negative refractive power; a third lens group having a positive refractive power; and a fourth lens group having a positive refractive power wherein the first lens group, the second lens group, the third lens group and the fourth lens group are sequentially arranged from an object side to an image surface side, while zooming from a wide-angle position to a telephoto position, the first lens group is moved in such a way that the distance between the first lens group and the second lens group is widened, the second lens group is moved along a trajectory convex toward the image surface side, the third lens group is moved from the image surface side to the object side, and the fourth lens group is moved along a trajectory convex toward the object side, and the zoom lens satisfies the following inequalities:

$$vd1ave > 68.2,$$

$$Nd1ave > 1.53, \text{ and}$$

$$0.32 < \beta 234T/fw < 0.5$$

where vd1ave is the average of Abbe numbers of positive lenses belonging to the first lens group, Nd1ave is the average of refractive indexes of the positive lenses belonging to the first lens group, β234T is the combined magnification ratio of the second lens group, the third lens group, and the fourth lens group, at the telephoto position, and fw is a focal length of the zoom lens at the wide-angle position.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
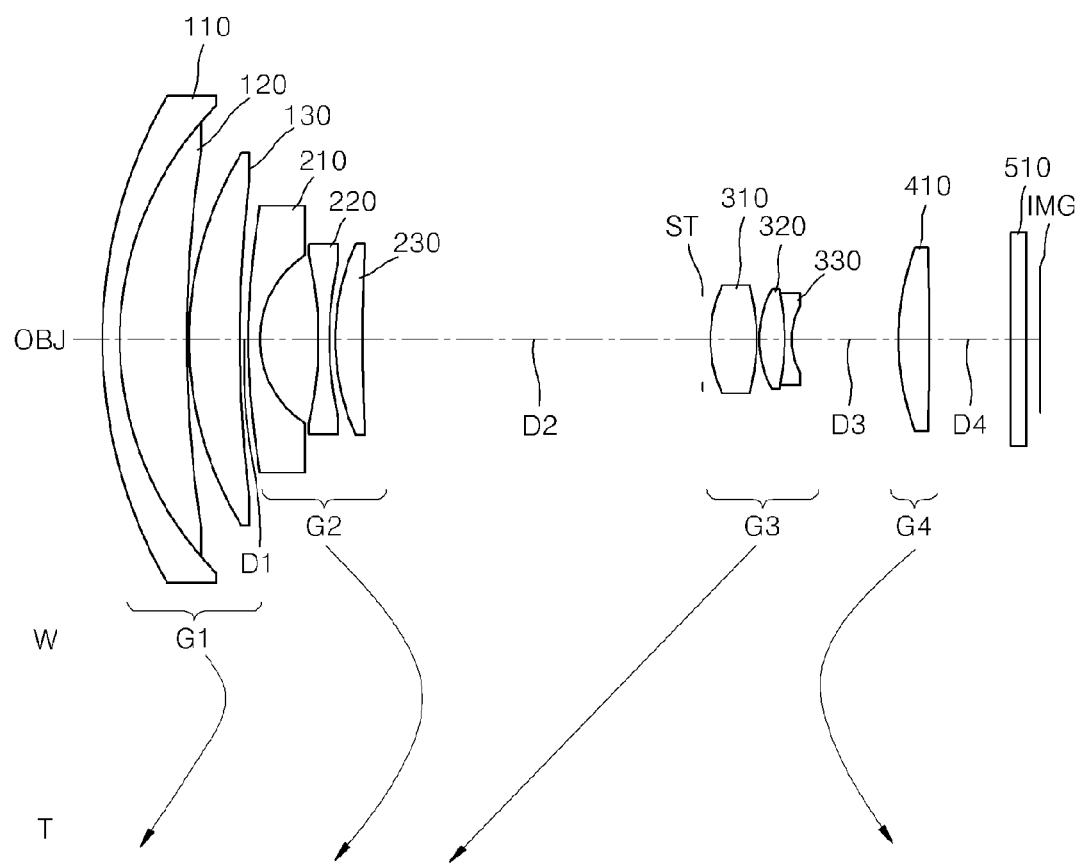
FIG. 1 illustrates an optical arrangement of a zoom lens and zooming motion thereof, according to an embodiment of the invention.

Reference will now be made in detail to embodiments, examples of which are illustrated in the accompanying drawings, wherein like reference numerals refer to the like elements throughout. In the drawings, the sizes of elements are exaggerated for clarity.

FIGS. 1, 5, 9, and 13 illustrate optical arrangements of zoom lenses according to embodiments of the invention. Referring to FIGS. 1, 5, 9, and 13, each of the zoom lenses includes, ordered from an object OBJ side to an image IMG surface side, a first lens group G1 having a positive refractive power, a second lens group G2 having a negative refractive power, and a third lens group G3 having a positive refractive power. A fourth lens group G4 having a positive refractive power may be disposed on the image IMG surface side of the third lens group G3, and an infrared filter 510 may be disposed on the image IMG surface side of the fourth lens group G4. The image IMG surface may be an image surface of an imaging device such as a charge coupled device (CCD) or a complementary metal-oxide semiconductor (CMOS).

In the zoom lenses according to embodiments of the invention, lens groups thereof may be moved along an optical axis. While zooming from a wide-angle position to a telephoto position, the first lens group G1 is moved in such a way that the distance between the first lens group G1 and the second lens group G2 is widened, the second lens group G2 is moved along a trajectory convex toward the image IMG surface side, the third lens group G3 is moved from the image IMG surface side to the object OBJ side, and the fourth lens group G4 is moved along a trajectory convex toward the object OBJ. The trajectories during zooming are represented by arrows. A diaphragm ST is disposed on the object OBJ side of the third lens group G3, and is moved together with the third lens group G3 during zooming. Such trajectories of the respective lens groups are defined in consideration of compactness and aberration of the optical system. Since the second lens group G2 is moved along a trajectory convex toward the image IMG surface, a total length of the optical system at the telephoto position is reduced and the refractive power of the third lens group G3 may be controlled to be not too strong. If the refractive power of the third lens group G3 is enhanced, the movement of the third lens group G3 may be reduced. However, an astigmatic field curvature may deteriorate, and thus the optical system may require more lenses.

Each of the zoom lenses according to embodiments of the invention may be suitable for compact and thin structure, and has high zoom magnification ratio, and satisfies the following inequalities:

$$vd1ave > 68.2, \text{ and} \quad \text{Inequality 1}$$

$$Nd1ave > 1.53 \quad \text{Inequality 2}$$

Where vd1ave is the average of Abbe numbers of positive lenses belonging to the first lens group G1, and Nd1ave is the average of refractive indexes of the positive lenses belonging to the first lens group G1.

Inequalities 1 and 2 are given in consideration of compactness and chromatic aberration correction of the lens system. For example, if the positive lens belonging to the first lens group G1 is formed of a material having a high Abbe number, the refractive index of the material is reduced and thus compactness may not be achieved. If the positive lens belonging to the first lens group G1 is formed of a material having a high refractive index, the Abbe number of the material is reduced. Thus a high zoom magnification ratio and correction of chromatic aberration may not be obtained at the same time. Thus, the lower limit of the average of Abbe numbers of positive lenses belonging to the first lens group G1 and the lower limit of the average of refractive indexes of the positive lenses belonging to the first lens group G1 are fixed to obtain a high zoom magnification ratio, correction of chromatic aberration and compactness.

Each of the zoom lenses according to embodiments of the invention may satisfy the following inequality:

$$0.85 < |\beta 2T| < 1.5 \qquad \text{Inequality 3}$$

where β2T is the magnification ratio of the second lens group G2 at the telephoto position.

The magnification ratio of the second lens group G2 is defined by Inequality 3. If |β2T| is lower than the lower limit, the second lens group G2 may affect the zoom magnification ratio only slightly and thus a high zoom magnification ratio may not be obtained. In addition, if |β2T| is higher than the upper limit, the second lens group G2 may affect the magnification ratio greatly. However, in this regard, aberration is greater at the telephoto position and thus the second lens group G2 may need more lenses.

Each of the zoom lenses according to embodiments of the invention may satisfy the following inequality:

$$6.3 < f1/fw < 9.15 \qquad \text{Inequality 4}$$

where f1 is the focal length of the first lens group G1 and fw is the focal length of the zoom lens at the wide-angle position.

The focal length of the first lens group G1 is defined with respect to the focal length of the zoom lens at the wide-angle position by Inequality 4. If f1/fw is less than the lower limit, coma aberration and astigmatic field curvature are more likely to occur. In addition, sensitivity to eccentricity is increased and thus a diaphragm having high accuracy may be required. If f1/fw is greater than the higher limit, the focal length of the first lens group G1 is increased and thus a compact optical system may not be obtained.

Each of the zoom lenses according to embodiments of the invention may satisfy the following inequality:

$$0.32 < \beta 234T/fw < 0.5 \qquad \text{Inequality 5}$$

where β234T is the combined magnification ratio of the second lens group G2, the third lens group G3, and the fourth lens group G4 at the telephoto position, and fw is the focal length of the zoom lens at the wide-angle position.

The combined magnification ratio of the second lens group G2, the third lens group G3, and the fourth lens group G4 at the telephoto position is defined with respect to the focal length of the zoom lens at the wide-angle position by Inequality 5. If β234T/fw is lower than the lower limit, that is, if the combined magnification ratio of the second lens group G2, the third lens group G3, and the fourth lens group G4 at the telephoto position is reduced, the focal length of the zoom lens at the telephoto position is reduced and thus, a high zoom magnification ratio may not be obtained. If β234T/fw is higher than the upper limit, the focal length of the zoom lens at the telephoto position is too long, and thus an optical system may require more lenses.

Each of the zoom lenses according to embodiments of the invention may satisfy the following inequality:

$$|vd1\text{ave} - vd3\text{ave}| < 9.0 \qquad \text{Inequality 6}$$

where vd1ave is the average of the Abbe numbers of the positive lenses belonging to the first lens group G1, and vd3ave is the average of Abbe numbers of positive lenses belonging to the third lens group G3.

The difference between the average of the Abbe numbers of the positive lenses belonging to the first lens group G1 and the average of the Abbe numbers of the positive lenses belonging to the third lens group G3 is defined by Inequality 6 for chromatic aberration. If |vd1ave−vd3ave| is within the range described above, axial chromatic aberration at the telephoto position and chromatic aberration of magnification at the wide-angle position may be appropriately corrected by using a small number of lenses.

Each of the zoom lenses according to embodiments of the invention may satisfy the following inequality:

$$\beta 4T > 0.6 \qquad \text{Inequality 7}$$

where β4T is the magnification ratio of the fourth lens group G4 at the telephoto position.

The magnification ratio of the fourth lens group G4 is defined by Inequality 7. If β4T is less than the lower limit, that is, the magnification ratio of the fourth lens group G4 is small, the distance between the fourth lens group G4 and the image IMG surface is increased and thus compactness may not be obtained.

Each of the zoom lenses according to embodiments of the invention may satisfy the following inequality:

Inequality 8

$$ft/fw > 11$$

where ft is the focal length of the zoom lens at the telephoto position, and fw is the focal length of the zoom lens at the wide-angle position.

A zoom magnification ratio is defined by inequality 8, and the zoom lenses according to embodiments of the invention may have a high zoom magnification ratio greater than 11.

Hereinafter, detailed structure and lens data of the zoom lenses according to embodiments of the invention will be presented. In embodiments of the invention, an aspherical surface is defined by the following equation:

$$Z = \frac{Ch^2}{1+\sqrt{1-\varepsilon C^2 h^2}} + A4 \cdot h^4 + A6 \cdot h^6 + A8 \cdot h^8 + A10 \cdot h^{10} \qquad \text{Equation 9}$$

where h is the height in a direction perpendicular to the optical axis, Z is the distance from the vertex of a lens along the optical axis direction at the height h, C is the paraxial radius of curvature, c is a conic constant, and A4, A6, A8, and A10 are aspherical coefficients.

Hereinafter, f refers to the combined focal length of the zoom optical system, Fno refers to an F number, ω refers to the semi viewing angle, and * written to the side of a lens surface number denotes an aspherical surface, and ST refers to a diaphragm. In each embodiment, D1, D2, D3, and D4 are variable distances at the wide-angle position, the middle position, and the telephoto position.

First Embodiment

FIG. 1 illustrates a zoom lens according to an embodiment of the invention. Referring to FIG. 1, the first lens group G1 includes three or less lenses including at least one negative lens and at least one positive lens. For example, the first lens group G1 may include a first lens 110 that is a negative lens concave toward the image IMG surface side, a second lens 120 convex toward the object OBJ side, and a third lens 130 that is a positive lens convex toward the object OBJ side. The first lens 110 and the second lens 120 form a cemented lens.

The second lens group G2 includes a fourth lens 210 that is a negative lens concave toward the image IMG surface side, a fifth lens 220 that is a biconcave lens, and a sixth lens 230 that is a positive lens.

The third lens group G3 includes a front group having a positive refractive power and a rear group having a negative refractive power, and the front group and the rear group are spaced apart from each other by an air gap. The third lens group G3 may include at least one positive lens having at least one aspherical surface. For example, the third lens group G3 may include a seventh lens 310 that is a positive lens having aspherical facing surfaces, an eighth lens 320 that is a positive lens, and a ninth lens 330 that is a negative lens, wherein the eighth lens 320 and the ninth lens 330 form a cemented lens.

The fourth lens group G4 may include one positive lens, for example, a tenth lens 410 having aspherical facing surfaces.

Figure 2:
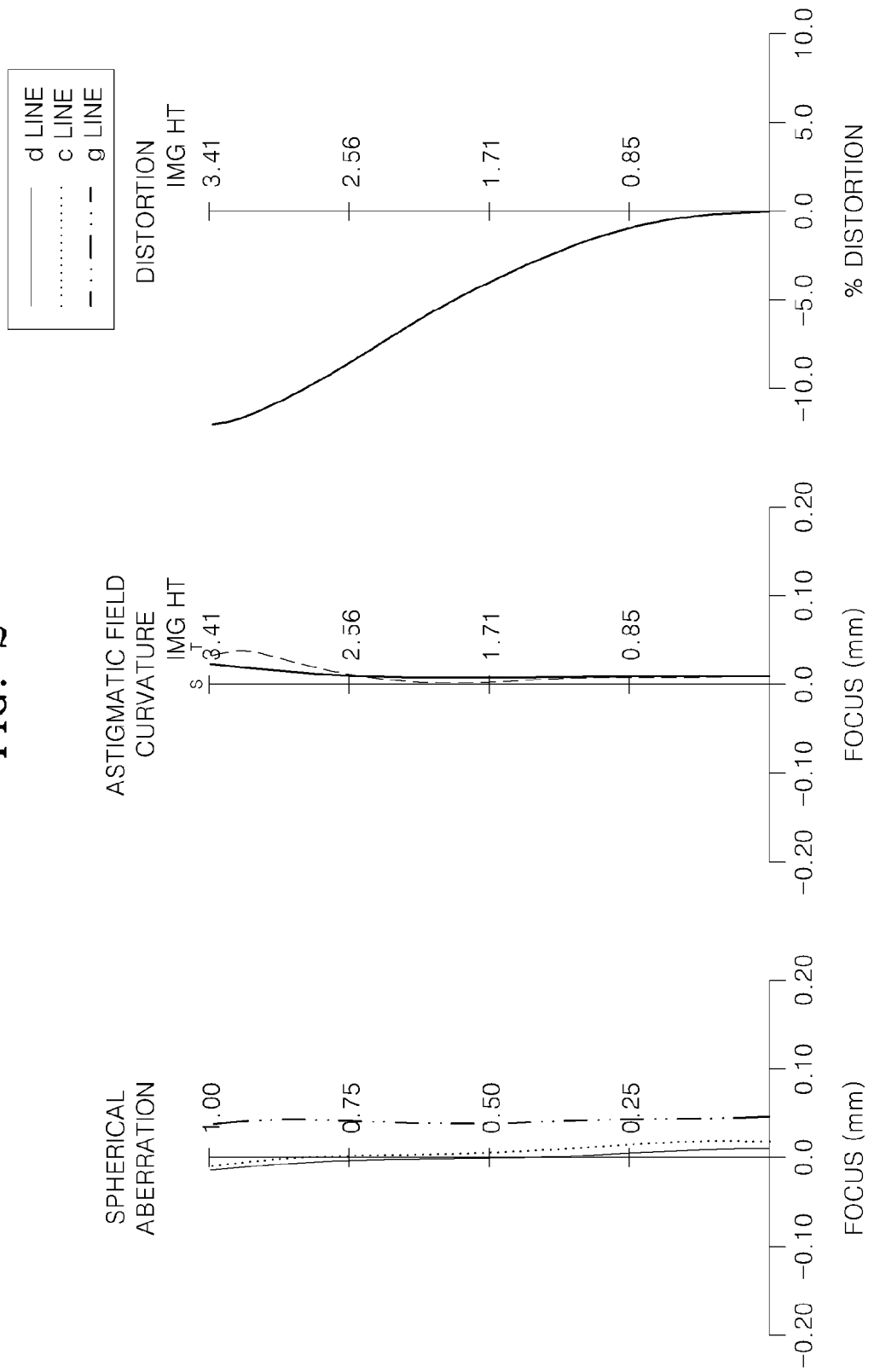
FIGS. 2, 3, and 4 are aberration graphs of longitudinal spherical aberration, astigmatic field curvature, and distortion of the zoom lens of FIG. 1 at a wide-angle position, a middle position, and a telephoto position, respectively.
Figure 3:
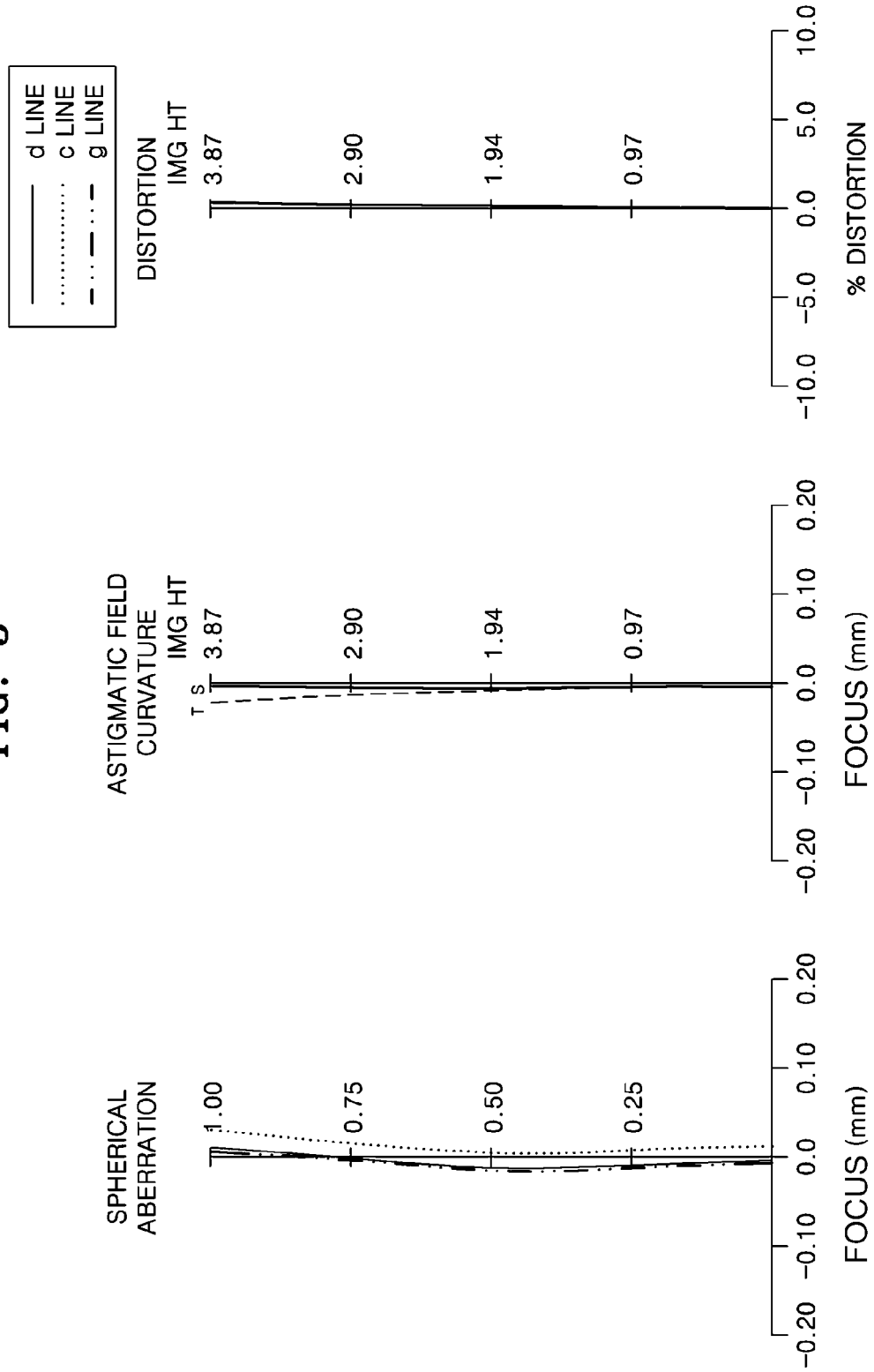
Figure 4:
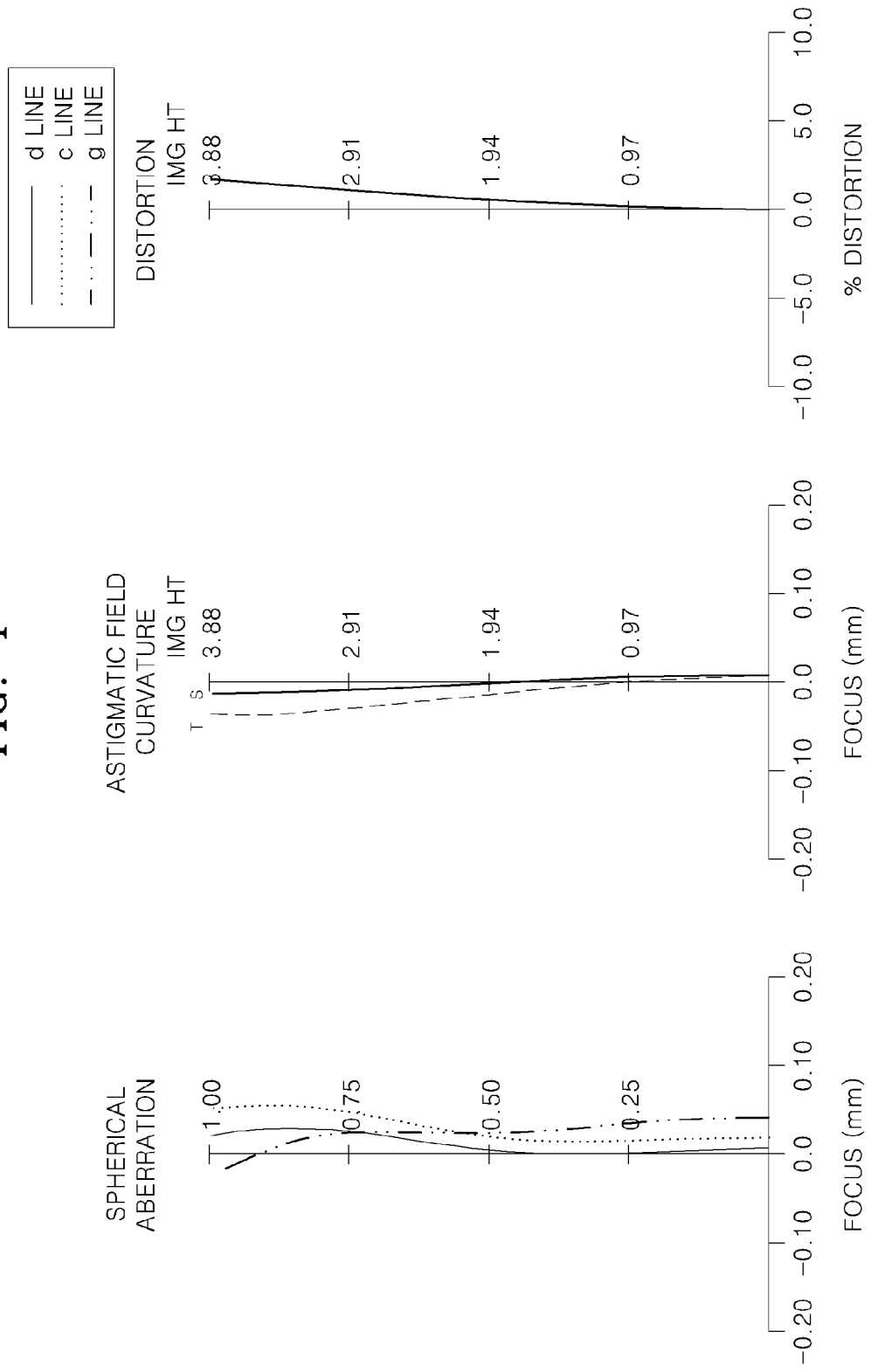

FIGS. 2, 3, and 4 are aberration graphs of longitudinal spherical aberration, astigmatic field curvature, and distortion of the zoom lens of FIG. 1 at the wide-angle, middle, and the telephoto positions, respectively. Referring to FIGS. 2, 3, and 4, the graphs of longitudinal spherical aberration are with respect to c line representing wavelength of 656.28 nm, d line representing wavelength of 587.56 nm, and f line representing wavelength of 435.83 nm, and the graphs of the astigmatic field curvature include a tangential field curvature (T) and a sagittal field curvature (S).

Lens data of the zoom lens according to the present embodiment is as follows.

| | | | |
|---|---|---|---|
| Fno | 3.29 | 4.73 | 5.77 |
| f | 4.39 | 17.22 | 50.15 |
| ω | 41.48 | 12.63 | 4.34 |
| D1 | 0.395 | 8.186 | 17.958 |
| D2 | 17.886 | 3.372 | 1.340 |
| D3 | 5.610 | 3.397 | 17.899 |
| D4 | 4.323 | 13.531 | 6.462 |

| Surface | Radius of Curvature (R) | Thickness (D) | Refractive Index (nd) | Abbe number (vd) |
|---|---|---|---|---|
| 1 | 26.188 | 0.900 | 1.90366 | 31.32 |
| 2 | 17.688 | 3.548 | 1.49700 | 81.61 |
| 3 | 68.854 | 0.100 | | |
| 4 | 19.305 | 2.765 | 1.61800 | 63.40 |
| 5 | 89.244 | D1 | | |
| 6 | 47.618 | 0.540 | 1.88300 | 40.81 |
| 7 | 5.321 | 3.148 | | |
| 8 | −19.859 | 0.550 | 1.80420 | 46.50 |
| 9 | 19.859 | 0.319 | | |
| 10 | 12.322 | 1.480 | 1.94595 | 17.98 |
| 11 | 88.691 | D2 | | |
| ST | INF | 0.400 | | |
| 13* | 6.423 | 2.448 | 1.51470 | 63.80 |
| 14* | −11.271 | 0.100 | | |
| 15 | 5.538 | 1.355 | 1.48749 | 70.44 |
| 16 | −16.701 | 0.400 | 1.64769 | 33.84 |
| 17 | 4.114 | D3 | | |
| 18* | 14.914 | 1.600 | 1.52510 | 56.00 |
| 19* | −106.241 | D4 | | |
| 20 | INF | 0.800 | 1.51680 | 64.20 |
| 21 | INF | 0.730 | | |

| Surface | ε | A4 | A6 | A8 | A10 |
|---|---|---|---|---|---|
| 13 | 2.3958 | −0.134264E−02 | −0.609164E−04 | −0.587352E−06 | −0.289112E−06 |
| 14 | 1.0000 | −0.123019E−04 | −0.218169E−04 | −0.158110E−05 | −0.514118E−07 |
| 18 | 1.0000 | 0.837715E−04 | −0.105159E−04 | −0.445684E−06 | 0.357061E−07 |
| 19 | 1.0000 | 0.155347E−03 | −0.131933E−04 | −0.499882E−06 | 0.408832E−07 |

Second Embodiment

Figure 5:
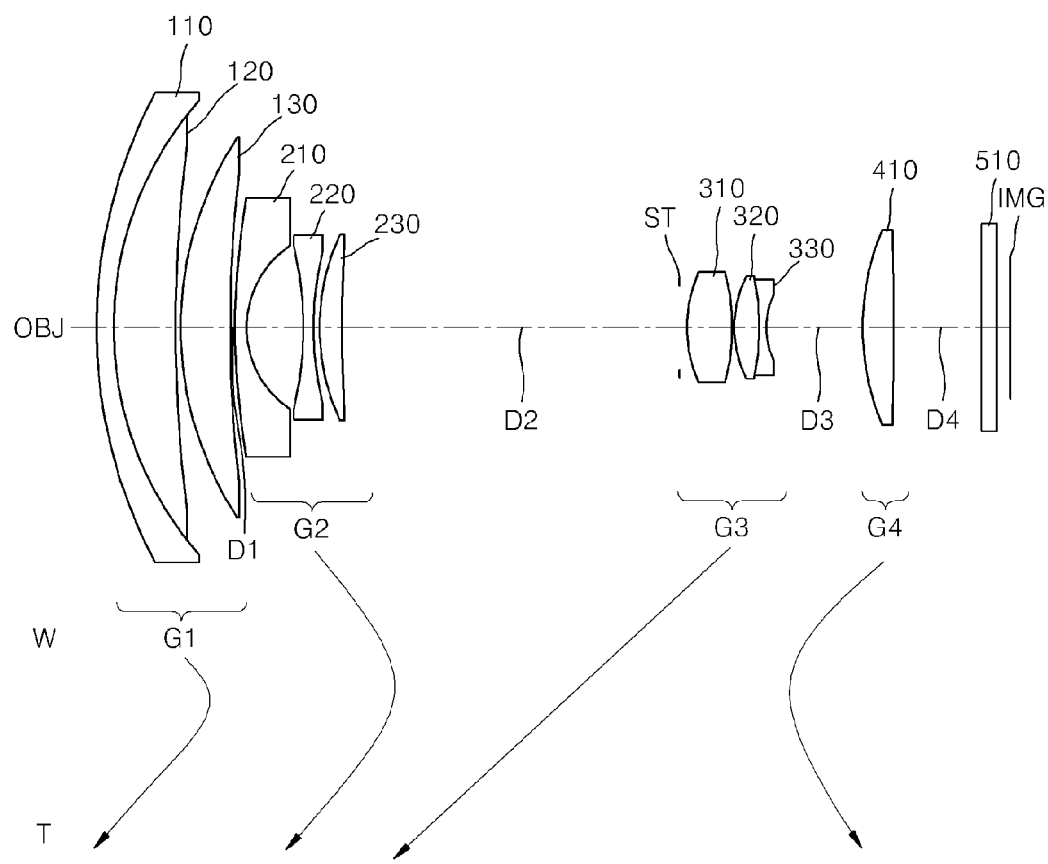
FIG. 5 illustrates an optical arrangement of a zoom lens and the movement of the zoom lens while zooming, according to another embodiment of the invention.

FIG. 5 illustrates a zoom lens according to another embodiment of the invention. Referring to FIG. 5, the first lens group G1 may include a first lens 110 that is a negative lens being concave on the IMG surface side, a second lens 120 convex toward the OBJ side, and a third lens 130 that is a positive lens being convex toward the OBJ side. The first lens 110 and the second lens 120 form a cemented lens. The second lens group G2 includes a fourth lens 210 that is a negative lens being concave toward the IMG surface side, a fifth lens 220 that is a biconcave lens, and a sixth lens 230 that is a positive lens. The third lens group G3 includes a front group having a positive refractive power and a rear group having a negative refractive power, and the front group and the rear group are spaced apart from each other by an air gap. The third lens group G3 may include at least a seventh lens 310 that is a positive lens having aspherical facing surfaces, an eighth lens 320 that is a positive lens, and a ninth lens 330 that is a negative lens, wherein the eighth lens 320 and the ninth lens 330 form a cemented lens. The fourth lens group G4 may include a tenth lens 410 having aspherical facing surfaces.

Figure 6:
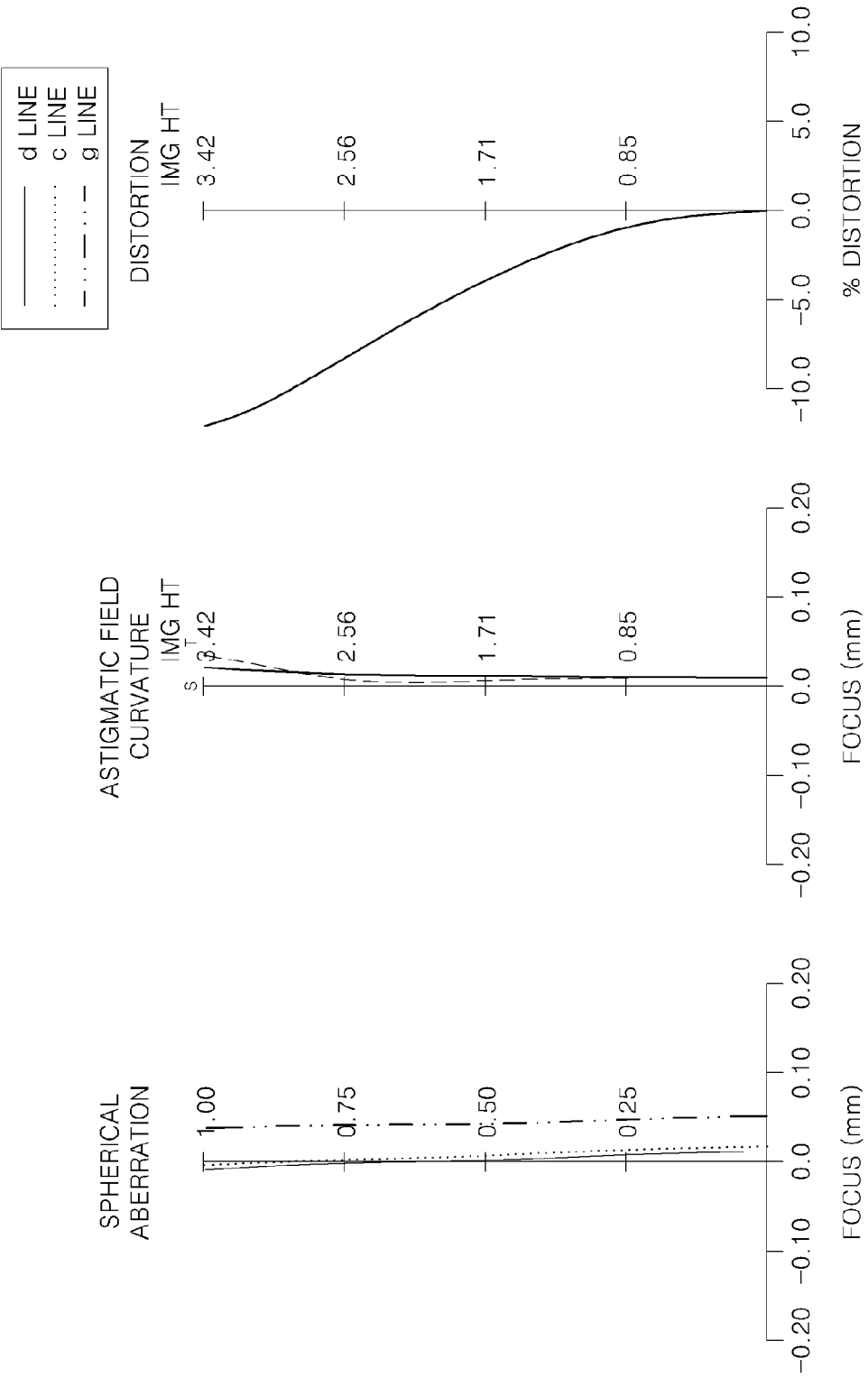
FIGS. 6, 7, and 8 are aberration graphs of longitudinal spherical aberration, astigmatic field curvature, and distortion of the zoom lens of FIG. 5 at a wide-angle position, a middle position, and a telephoto position, respectively.
Figure 7:
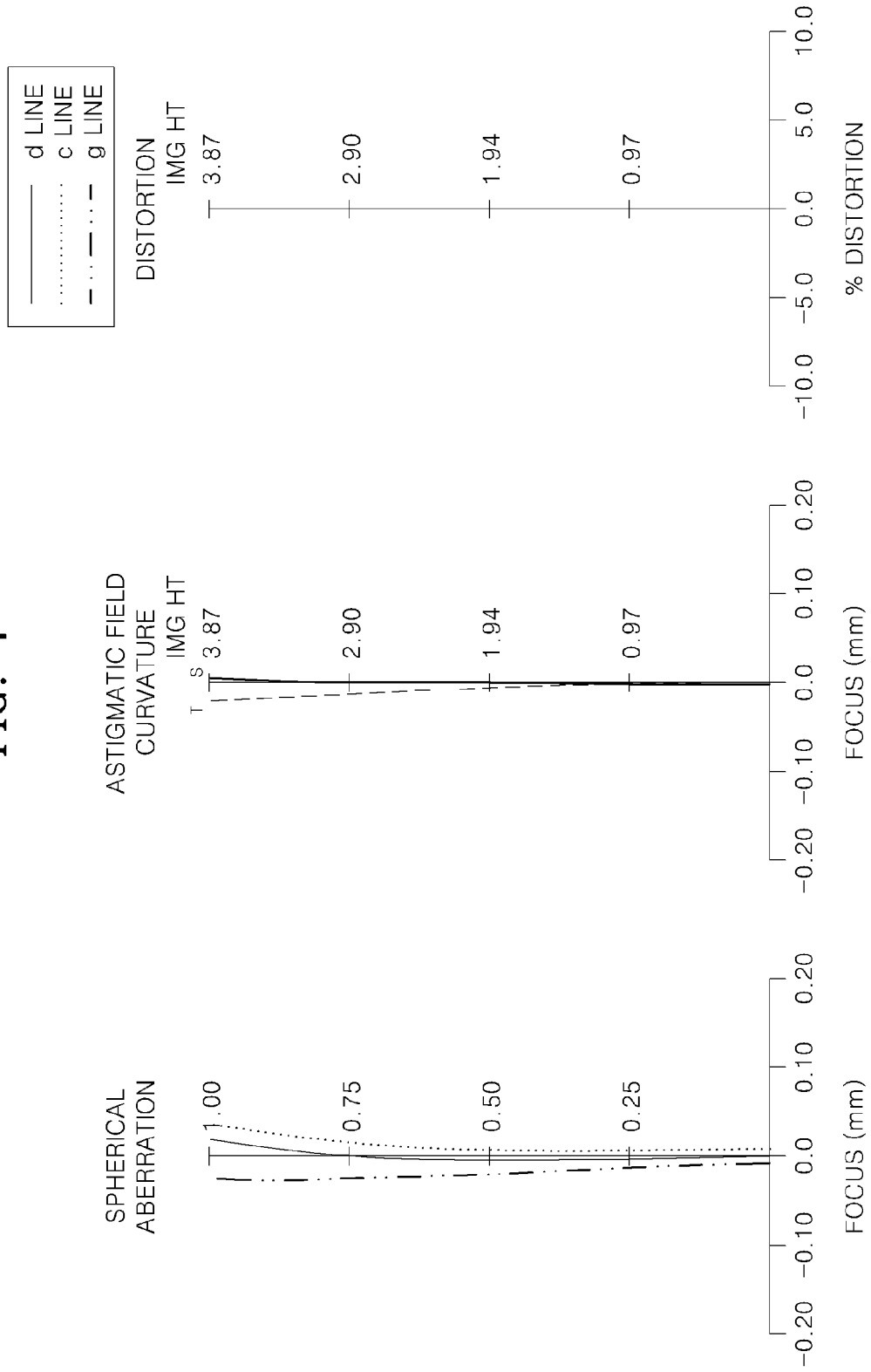
Figure 8:
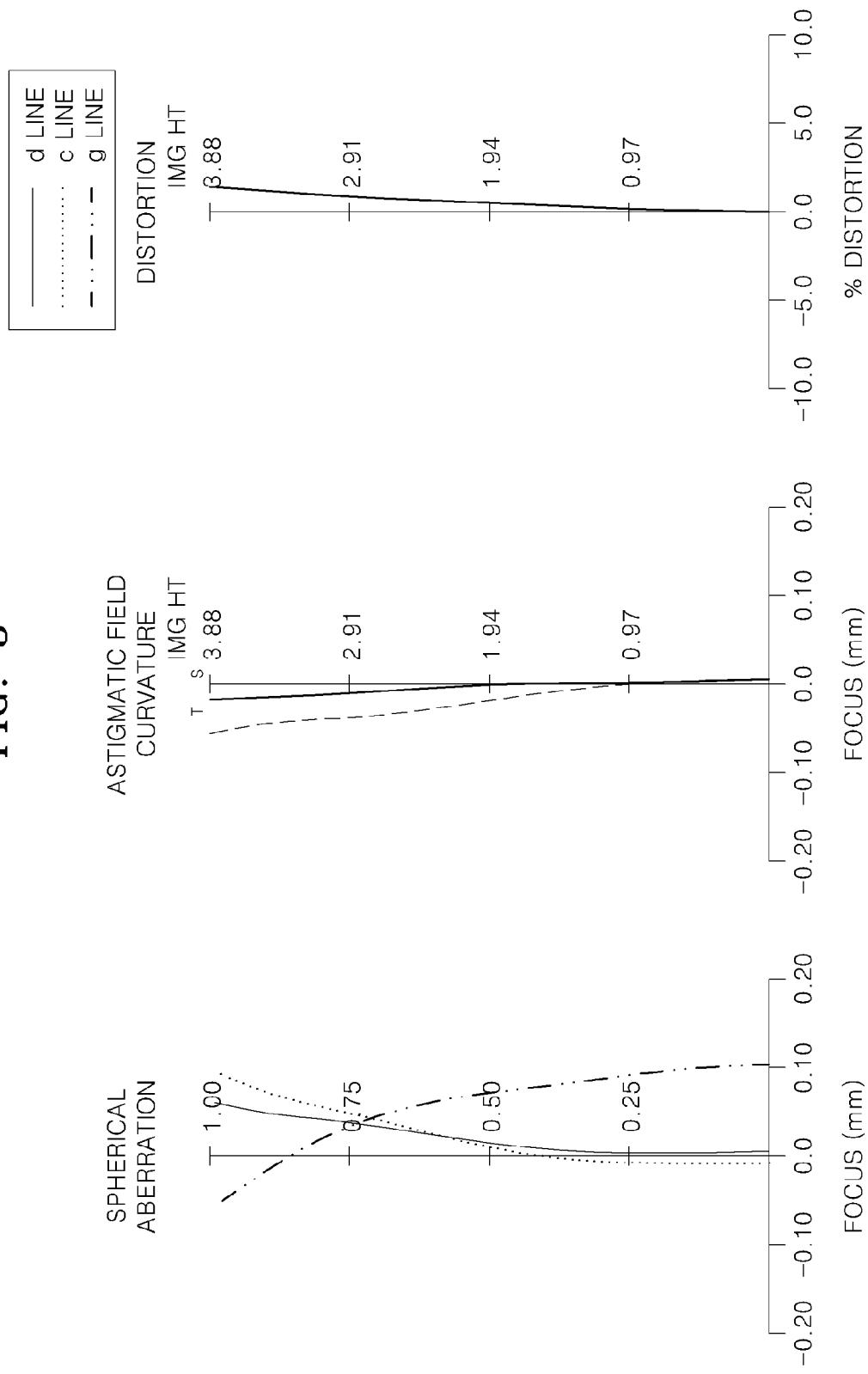

FIGS. 6, 7, and 8 are aberration graphs of longitudinal spherical aberration, astigmatic field curvature, and distortion of the zoom lens of FIG. 1 at the wide-angle, middle, and the telephoto positions, respectively. Referring to FIGS. 6, 7, and 8, the graphs of longitudinal spherical aberration are with respect to c line representing wavelength of 656.28 nm, d line representing wavelength of 587.56 nm, and f line representing wavelength of 435.83 nm, and the graphs of the astigmatic field curvature include a tangential field curvature (T) and a sagittal field curvature (S).

Lens data of the zoom lens according to the present embodiment is as follows.

| | | | |
|---|---|---|---|
| Fno | 3.29 | 4.71 | 5.99 |
| f | 4.43 | 17.41 | 61.89 |
| ω | 41.23 | 12.55 | 3.53 |
| D1 | 0.400 | 8.276 | 18.712 |
| D2 | 18.471 | 3.498 | 1.333 |
| D3 | 5.430 | 3.491 | 23.743 |
| D4 | 4.861 | 13.877 | 4.652 |

| Surface | Radius of Curvature (R) | Thickness (D) | Refractive Index (nd) | Abbe number (vd) |
|---|---|---|---|---|
| 1 | 27.179 | 0.900 | 1.90366 | 31.32 |
| 2 | 18.778 | 3.518 | 1.49700 | 81.61 |
| 3 | 92.739 | 0.100 | | |
| 4 | 19.167 | 2.725 | 1.59282 | 68.63 |
| 5 | 71.461 | D1 | | |
| 6 | 46.730 | 0.570 | 1.88300 | 40.81 |
| 7 | 5.409 | 3.101 | | |
| 8 | −20.159 | 0.570 | 1.88300 | 40.81 |

-continued

| Surface | Radius of Curvature (R) | Thickness (D) | Refractive Index (nd) | Abbe number (vd) |
|---|---|---|---|---|
| 9 | 20.159 | 0.303 | | |
| 10 | 12.786 | 1.406 | 1.94595 | 17.98 |
| 11 | 474.661 | D2 | | |
| ST | INF | 0.417 | | |
| 13* | 6.636 | 2.430 | 1.58313 | 59.46 |
| 14* | −14.895 | 0.100 | | |
| 15 | 6.274 | 1.280 | 1.49700 | 81.61 |
| 16 | −32.927 | 0.420 | 1.67270 | 32.17 |
| 17 | 4.281 | D3 | | |
| 18* | 15.232 | 1.673 | 1.58313 | 59.46 |
| 19* | −92.982 | D4 | | |
| 20 | INF | 0.800 | 1.51680 | 64.20 |
| 21 | INF | 0.810 | | |

| Surface | ε | A4 | A6 | A8 | A10 |
|---|---|---|---|---|---|
| 13 | 2.3844 | −0.115854E−02 | −0.436641E−04 | −0.134805E−05 | −0.101686E−06 |
| 14 | 1.0000 | −0.855484E−05 | −0.140015E−04 | −0.180618E−05 | 0.720190E−07 |
| 18 | 1.0000 | 0.765238E−04 | −0.583692E−05 | 0.226681E−07 | 0.172550E−08 |
| 19 | 1.0000 | 0.133370E−03 | −0.101203E−04 | 0.162454E−06 | 0.000000E+00 |

Third Embodiment

Figure 9:
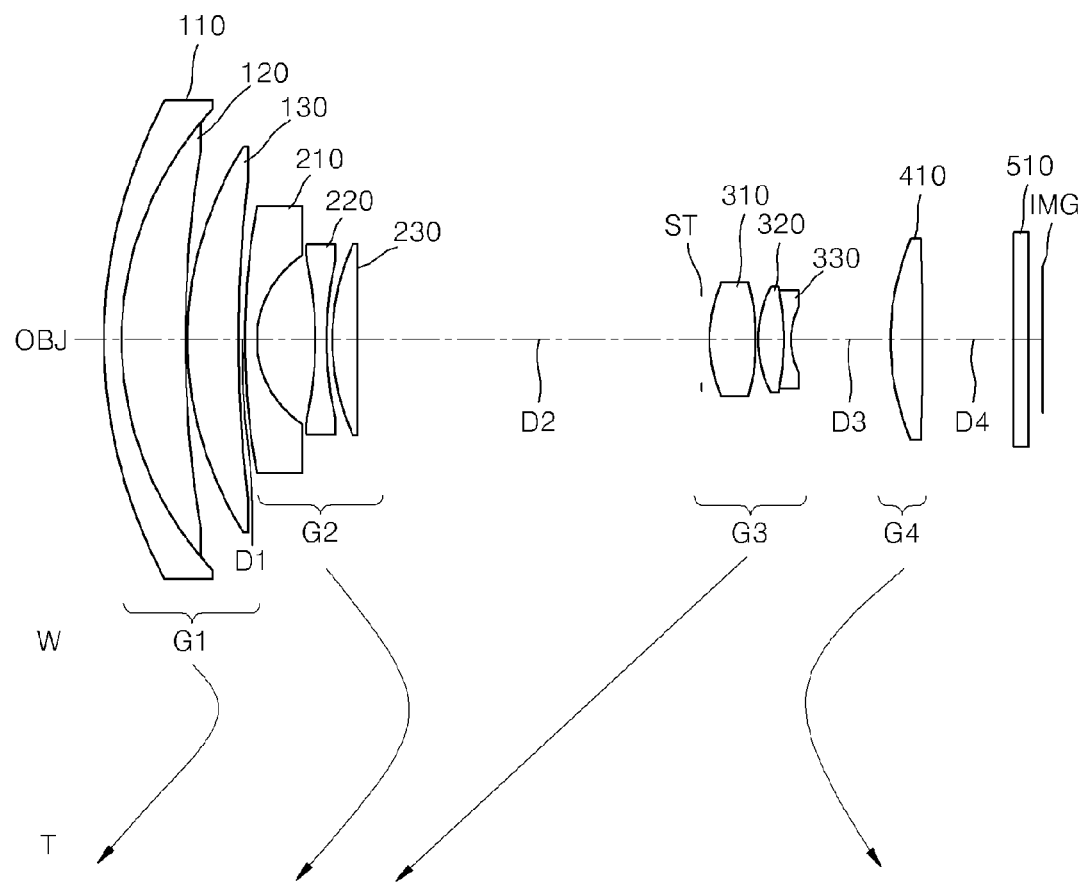
FIG. 9 illustrates an optical arrangement of a zoom lens and the movement of the zoom lens while zooming, according to another embodiment of the invention.

FIG. 9 illustrates a zoom lens according to another embodiment of the invention. Referring to FIG. 9, the first lens group G1 may include a first lens 110 that is a negative lens being concave toward the IMG surface side, a second lens 120 convex toward the OBJ side, and a third lens 130 that is a positive lens being convex toward the OBJ side. The first lens 110 and the second lens 120 form a cemented lens. The second lens group G2 includes a fourth lens 210 that is a negative lens being concave toward the IMG surface side, a fifth lens 220 that is a biconcave lens, and a sixth lens 230 that is a positive lens. The third lens group G3 includes a front group having a positive refractive power and a rear group having a negative refractive power, and the front group and the rear group are spaced apart from each other by an air gap. The third lens group G3 may include at least a seventh lens 310 that is a positive lens having aspherical facing surfaces, an eighth lens 320 that is a positive lens, and a ninth lens 330 that is a negative lens, wherein the eighth lens 320 and the ninth lens 330 form a cemented lens. The fourth lens group G4 may include a tenth lens 410 having aspherical facing surfaces.

Figure 10:
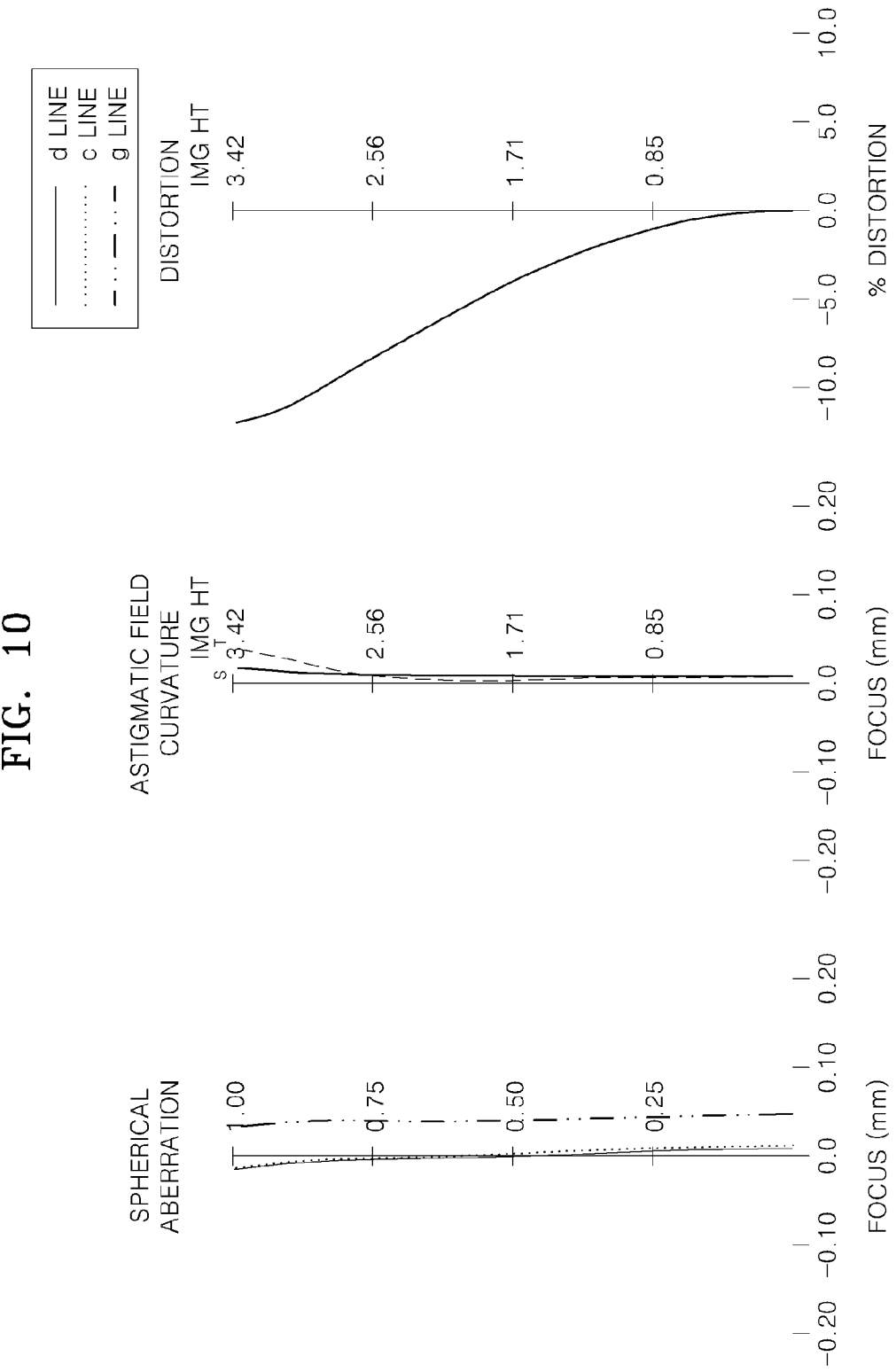
FIGS. 10, 11, and 12 are aberration graphs of longitudinal spherical aberration, astigmatic field curvature, and distortion of the zoom lens of FIG. 9 at a wide-angle position, a middle position, and a telephoto position, respectively.
Figure 11:
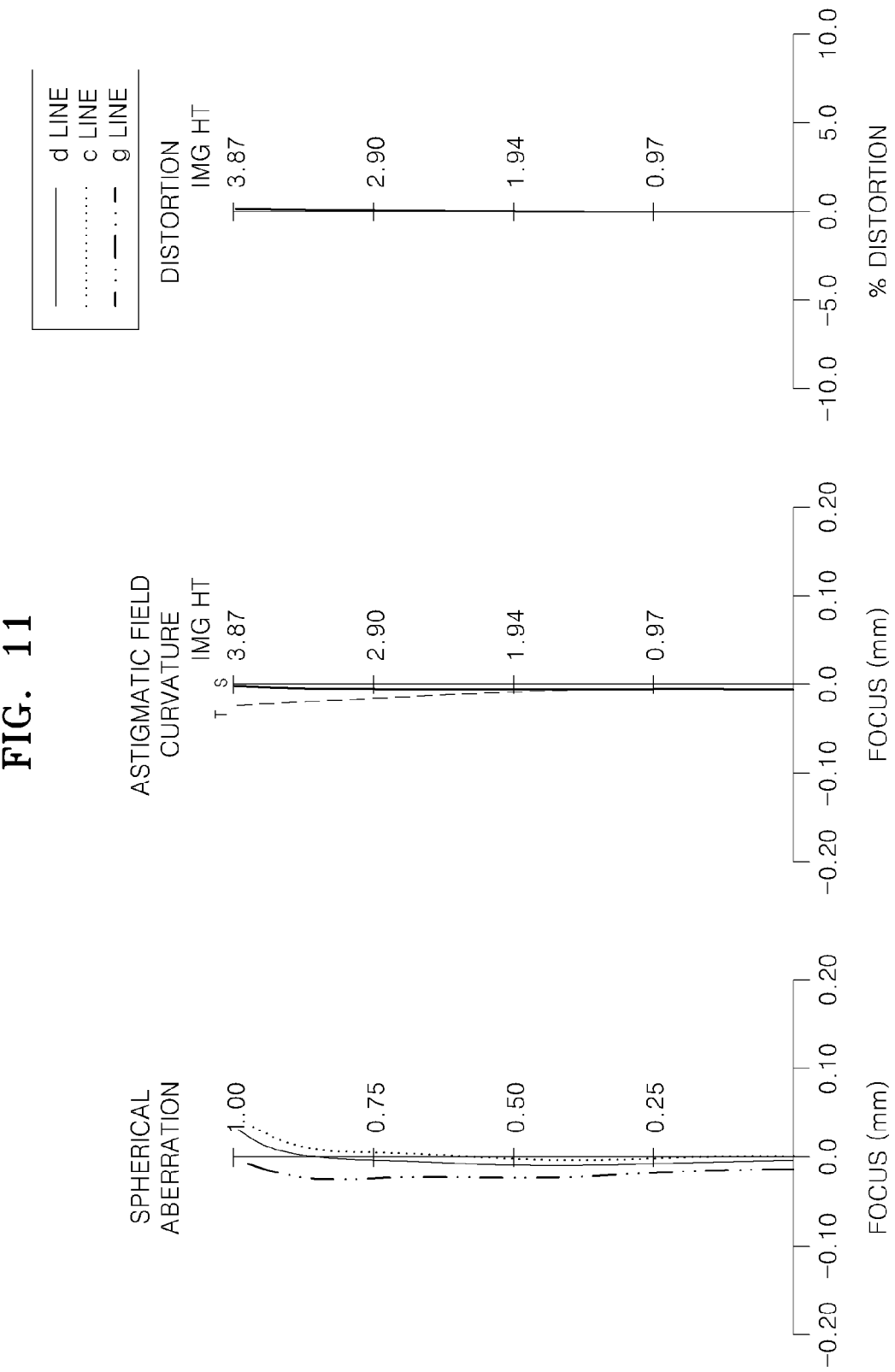
Figure 12:
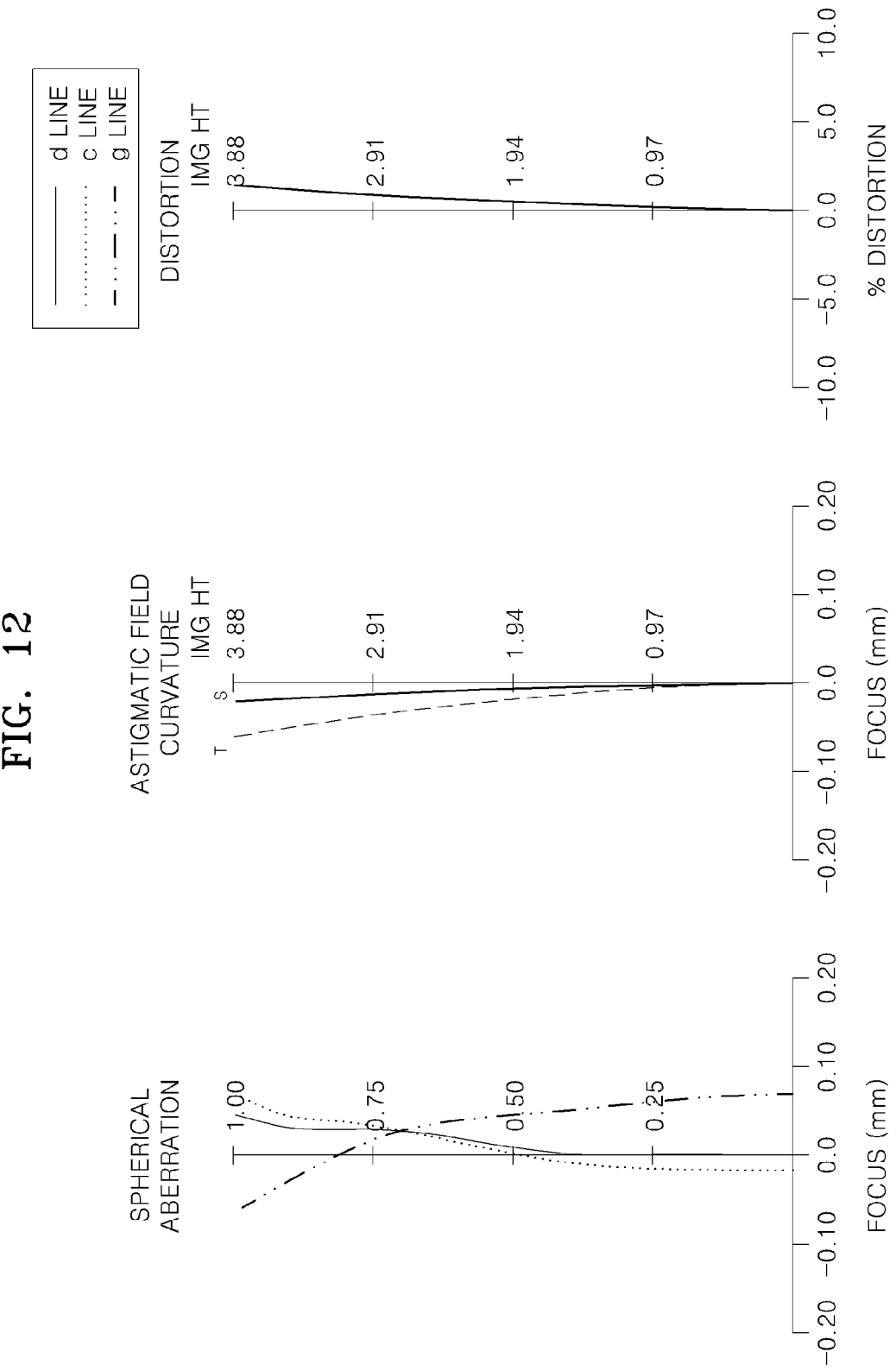

FIGS. 10, 11, and 12 are aberration graphs of longitudinal spherical aberration, astigmatic field curvature, and distortion of the zoom lens of FIG. 1 at the wide-angle, middle, and telephoto positions, respectively. Referring to FIGS. 10, 11, and 12, the graphs of longitudinal spherical aberration are with respect to c line representing the wavelength of 656.28 nm, d line representing the wavelength of 587.56 nm, and f line representing the wavelength of 435.83 nm, and the graphs of the astigmatic field curvature include a tangential field curvature (T) and a sagittal field curvature (S).

Lens data of the zoom lens according to the present embodiment is as follows.

| | | | |
|---|---|---|---|
| Fno | 3.08 | 4.30 | 5.99 |
| f | 4.43 | 17.40 | 58.40 |
| ω | 41.25 | 12.54 | 3.75 |
| D1 | 0.400 | 9.270 | 18.633 |
| D2 | 18.399 | 3.940 | 1.372 |
| D3 | 5.356 | 3.432 | 22.611 |
| D4 | 4.841 | 13.235 | 5.719 |

| Surface | Radius of Curvature (R) | Thickness (D) | Refractive Index (nd) | Abbe number (vd) |
|---|---|---|---|---|
| 1 | 27.425 | 0.900 | 1.90366 | 31.32 |
| 2 | 18.085 | 3.411 | 1.59282 | 68.63 |
| 3 | 63.625 | 0.100 | | |
| 4 | 20.110 | 2.777 | 1.59282 | 68.63 |
| 5 | 79.345 | D1 | | |
| 6 | 45.428 | 0.570 | 1.88300 | 40.81 |
| 7 | 5.364 | 3.130 | | |
| 8 | −20.100 | 0.570 | 1.88300 | 40.81 |
| 9 | 20.100 | 0.303 | | |
| 10 | 12.731 | 1.407 | 1.94595 | 17.98 |
| 11 | 392.168 | D2 | | |
| ST | INF | 0.400 | | |
| 13* | 6.382 | 2.550 | 1.58313 | 59.46 |
| 14* | −13.102 | 0.116 | | |
| 15 | 5.855 | 1.275 | 1.49700 | 81.61 |
| 16 | −30.836 | 0.420 | 1.64769 | 33.84 |
| 17 | 4.243 | D3 | | |
| 18* | 15.232 | 1.758 | 1.58313 | 59.39 |
| 19* | −188.298 | D4 | | |
| 20 | INF | 0.800 | 1.51680 | 64.20 |
| 21 | INF | 0.800 | | |

| Surface | ε | A4 | A6 | A8 | A10 |
|---|---|---|---|---|---|
| 13 | 2.4415 | −0.126519E−02 | −0.390142E−04 | −0.273319E−05 | −0.390860E−07 |
| 14 | 1.0000 | 0.102004E−03 | 0.372324E−05 | −0.409894E−05 | 0.264563E−06 |
| 18 | 1.0000 | 0.833053E−04 | −0.980199E−05 | 0.205683E−06 | 0.705237E−09 |
| 19 | 1.0000 | 0.138003E−03 | −0.135617E−04 | 0.311966E−06 | 0.000000E+00 |

Fourth Embodiment

Figure 13:
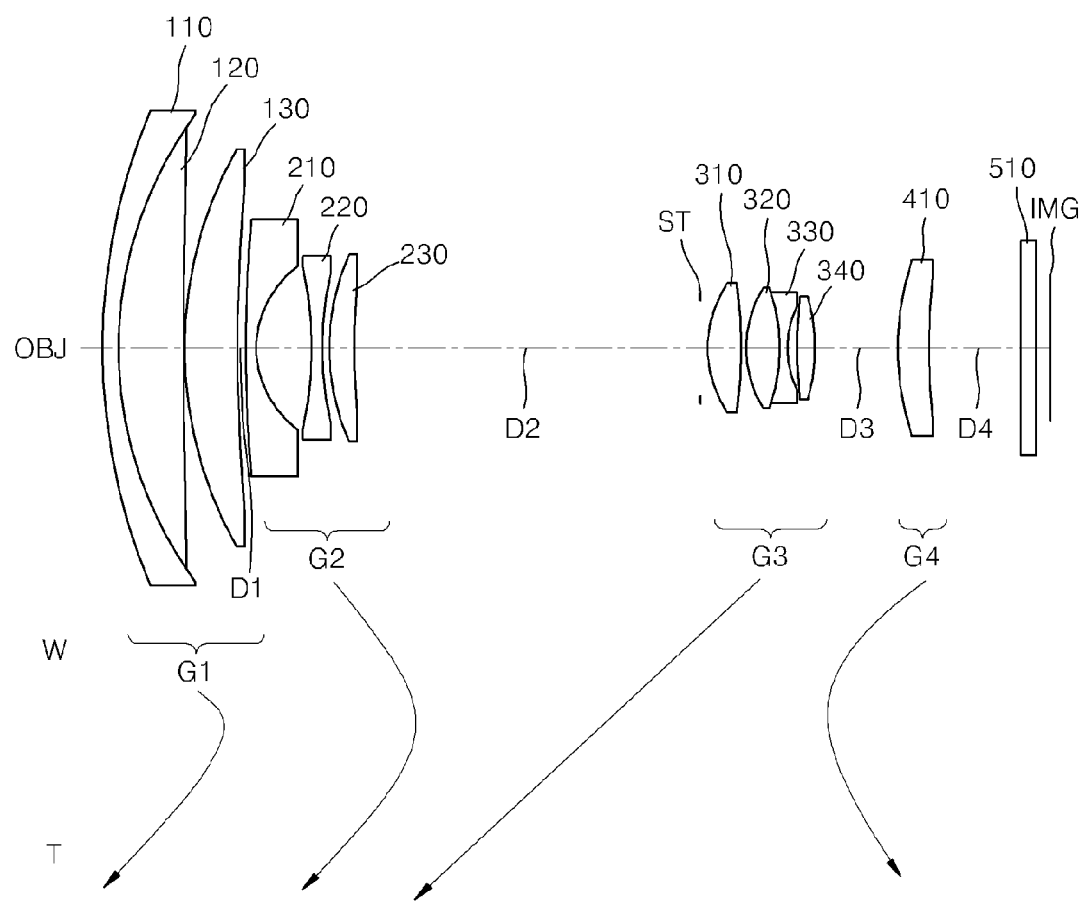
FIG. 13 illustrates an optical arrangement of a zoom lens and the movement of the zoom lens while zooming, according to another embodiment of the invention.

FIG. 13 illustrates a zoom lens according to another embodiment of the invention. Referring to FIG. 13, the first lens group G1 may include a first lens 110 that is a negative lens being concave toward the IMG surface side, a second lens 120 convex toward the OBJ side, and a third lens 130 that is a positive lens being convex toward the OBJ side. The first lens 110 and the second lens 120 form a cemented lens. The second lens group G2 includes a fourth lens 210 that is a negative lens being concave toward the IMG surface side, a fifth lens 220 that is a biconcave lens, and a sixth lens 230 that is a positive lens. The third lens group G3 includes a front group having a positive refractive power and a rear group having a negative refractive power, and the front group and the rear group are spaced apart from each other by an air gap. The third lens group G3 may include at least a seventh lens 310 that is a positive lens having aspherical facing surfaces, an eighth lens 320 that is a positive lens, a ninth lens 330 that is a negative lens, and a tenth lens 340 that is a positive lens, wherein the eighth lens 320 and the ninth lens 330 form a cemented lens. The fourth lens group G4 may include a tenth lens 410 having aspherical facing surfaces.

Figure 14:
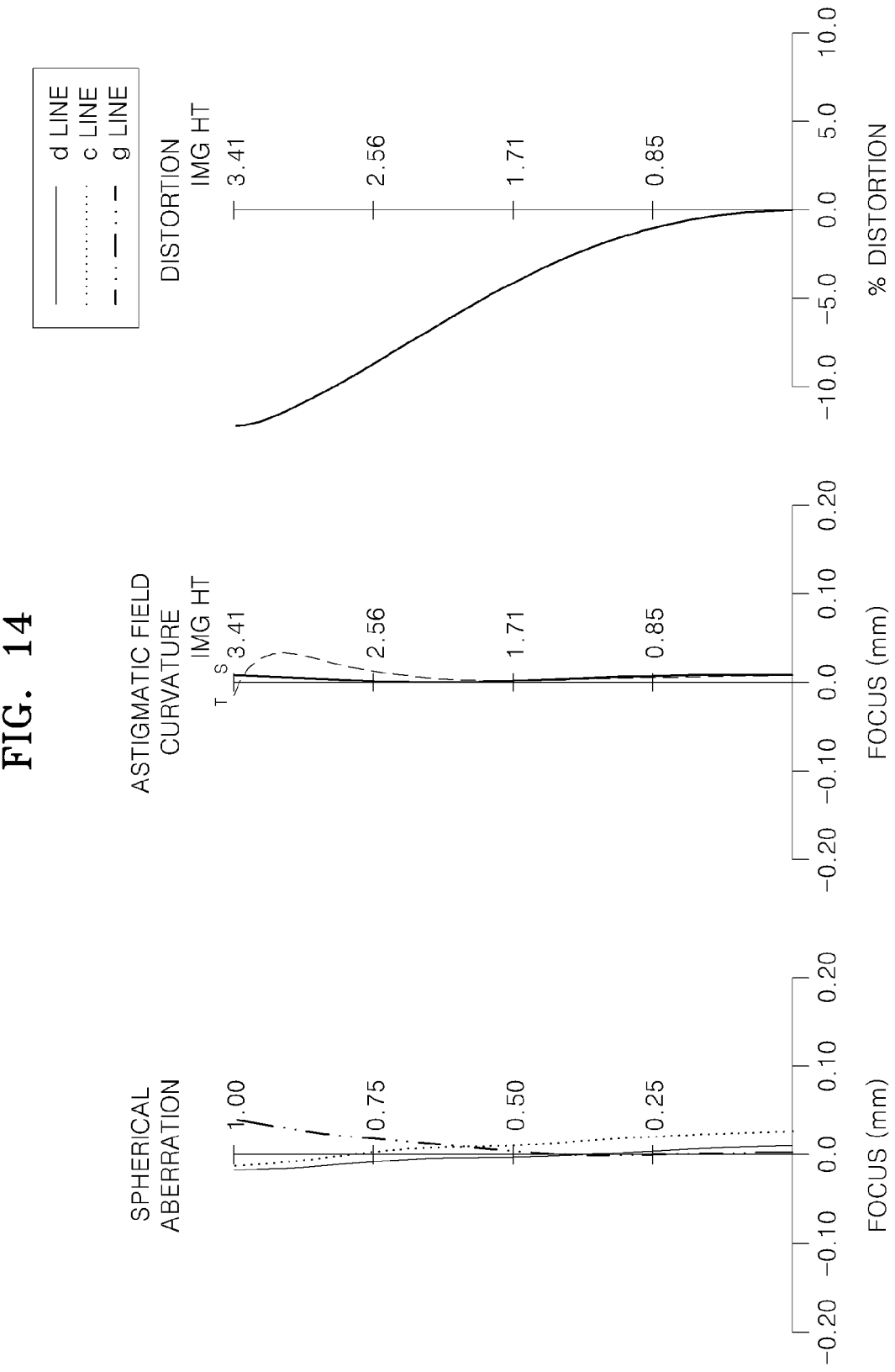
FIGS. 14, 15, and 16 are aberration graphs of spherical aberration, astigmatic field curvature, and distortion of the zoom lens of FIG. 13 at a wide-angle position, a middle position, and a telephoto position, respectively.
Figure 15:
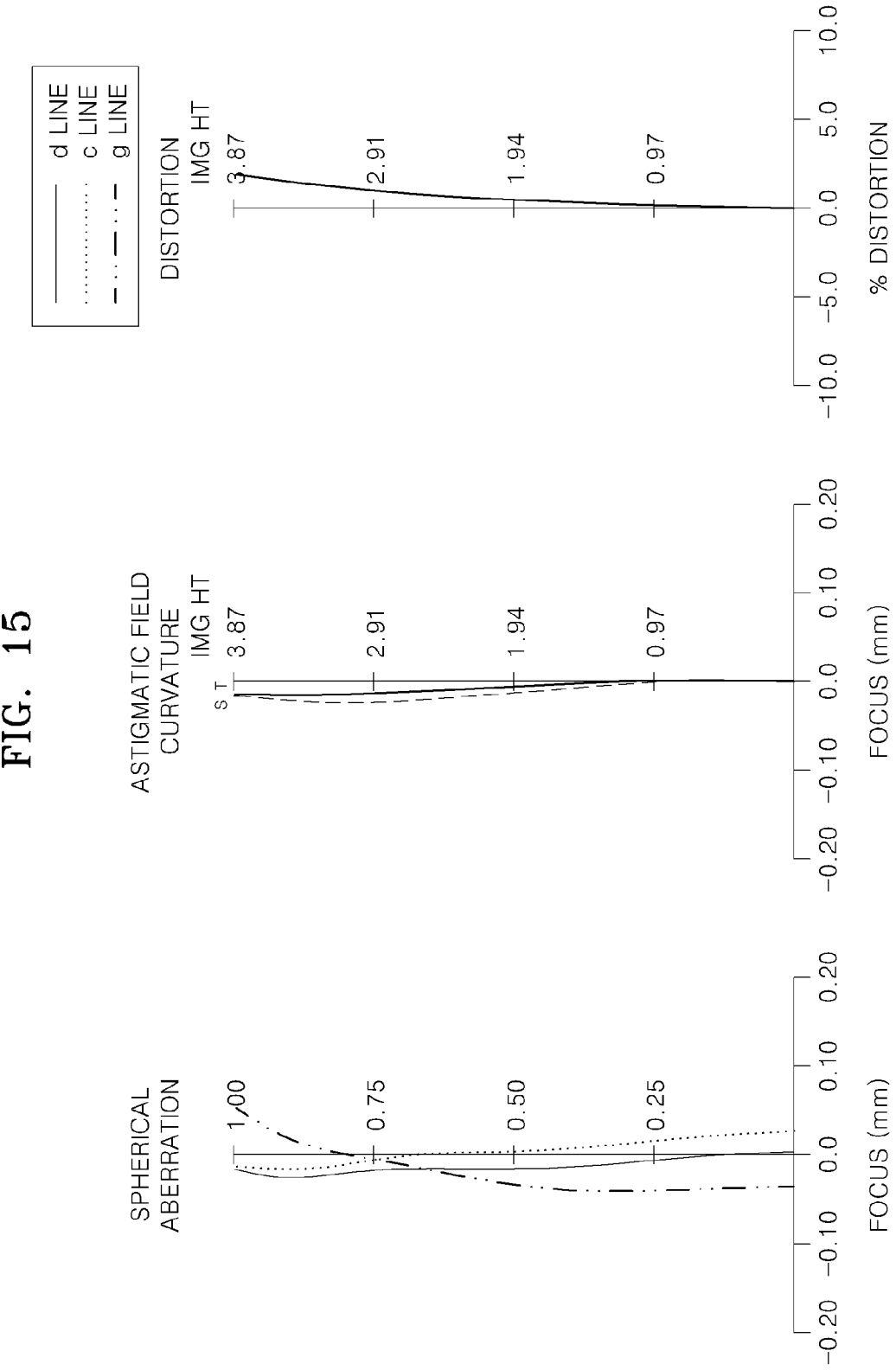
Figure 16:
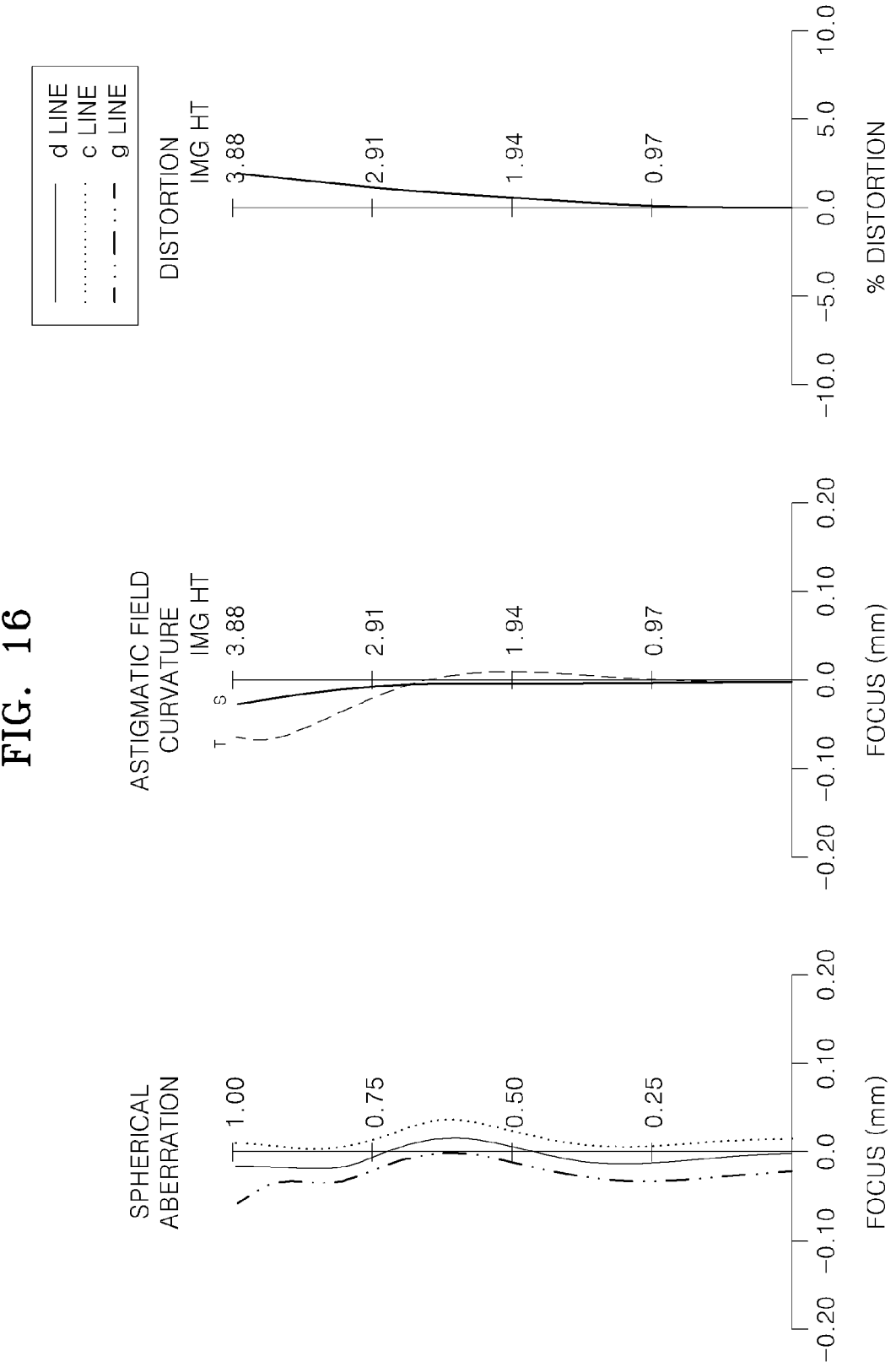

FIGS. 14, 15, and 16 are aberration graphs of longitudinal spherical aberration, astigmatic field curvature, and distortion of the zoom lens of FIG. 1 at the wide-angle, middle, and telephoto positions, respectively. Referring to FIGS. 14, 15, and 16, the graphs of longitudinal spherical aberration are with respect to c line representing the wavelength of 656.28 nm, d line representing the wavelength of 587.56 nm, and f line representing the wavelength of 435.83 nm, and the graphs of the astigmatic field curvature include a tangential field curvature (T) and a sagittal field curvature (S).

Lens data of the zoom lens according to the present embodiment is as follows.

| Fno | 3.29 | ~4.48 | ~5.99 |
|---|---|---|---|
| f | 4.44 | ~17.41 | ~65.79 |
| ω | 41.28 | ~12.33 | ~3.31 |
| D1 | 0.400 | ~11.819 | ~19.568 |
| D2 | 18.246 | ~6.155 | ~1.331 |
| D3 | 4.393 | ~2.899 | ~23.514 |
| D4 | 4.893 | ~12.159 | ~2.707 |

| Surface | Radius of Curvature (R) | Thickness (D) | Refractive Index (nd) | Abbe number (vd) |
|---|---|---|---|---|
| 1 | 32.557 | 0.900 | 1.90366 | 31.32 |
| 2 | 20.658 | 3.412 | 1.49700 | 81.61 |
| 3 | 197.613 | 0.100 | | |
| 4 | 21.399 | 2.803 | 1.59282 | 68.63 |
| 5 | 136.038 | D1 | | |
| 6 | 81.895 | 0.570 | 1.88300 | 40.81 |
| 7 | 5.339 | 2.887 | | |
| 8 | -19.894 | 0.570 | 1.80420 | 46.50 |
| 9 | 19.894 | 0.347 | | |
| 10 | 12.060 | 1.401 | 1.94595 | 17.98 |
| 11 | 84.737 | D2 | | |
| ST | INF | 0.417 | | |
| 13* | 6.041 | 1.732 | 1.58313 | 59.46 |
| 14* | -33.182 | 0.254 | | |
| 15 | 6.122 | 1.747 | 1.48749 | 70.44 |
| 16 | -10.619 | 0.420 | 1.83400 | 37.35 |
| 17 | 4.908 | 0.564 | | |
| 18 | 46.461 | 0.900 | 1.48749 | 70.44 |
| 19 | -9.678 | D3 | | |
| 20* | 15.156 | 1.650 | 1.58313 | 59.46 |
| 21* | 33.945 | D4 | | |
| 22 | INF | 0.800 | 1.51680 | 64.20 |
| 23 | INF | 0.800 | | |

| Surface | ϵ | A4 | A6 | A8 | A10 |
|---|---|---|---|---|---|
| 13 | 2.2022 | -0.958566E-03 | -0.413376E-04 | -0.657337E-06 | -0.246907E-06 |
| 14 | 1.0000 | 0.151758E-04 | 0.181944E-05 | -0.272186E-05 | 0.796420E-07 |
| 20 | 1.0000 | -0.177361E-03 | -0.779975E-05 | 0.858112E-06 | -0.118847E-07 |
| 21 | 1.0000 | -0.217800E-03 | -0.820042E-05 | 0.693812E-06 | 0.000000E+00 |

The following table shows that the zoom lenses according to embodiments described above satisfy Inequalities 1 through 8.

| Conditions | First Embodiment | Second Embodiment | Third Embodiment | Fourth Embodiment |
|---|---|---|---|---|
| 1 vd1ave | 72.51 | 75.12 | 68.63 | 75.12 |
| 2 Nd1ave | 1.558 | 1.545 | 1.593 | 1.545 |
| 3 \|β2τ\| | 1.052 | 1.170 | 1.081 | 1.050 |
| 4 ft/fw | 7.762 | 7.788 | 7.903 | 7.850 |
| 5 β234T/fw | 0.337 | 0.405 | 0.377 | 0.427 |
| 6 \|vd1ave − vd3ave\| | 5.380 | 4.585 | 4.075 | 8.340 |
| 7 β4τ | 0.649 | 0.693 | 0.666 | 0.871 |
| 8 ft/fw | 11.45 | 13.98 | 13.18 | 14.86 |

As described above, the zoom lenses according to embodiments described above have a compact and thin structure, and a high zoom magnification ratio, and also aberrations thereof may be easily corrected.

The zoom lenses according to embodiments described above may be used in various imaging apparatuses together with an imaging device that generates an image of a subject using light that enters through such zoom lenses.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A zoom lens comprising:
a first lens group having a positive refractive power;
a second lens group having a negative refractive power;
a third lens group having a positive refractive power; and
a fourth lens group having a positive refractive power and consists of one lens,
wherein the first lens group, the second lens group, the third lens group, and the fourth lens group are sequentially arranged from an object side to an image surface side,
while zooming from a wide-angle position to a telephoto position, the first lens group is moved in such a way that the distance between the first lens group and the second lens group is widened, the second lens group is moved along a trajectory convex toward the image surface side, the third lens group is moved from the image surface side to the object side, and the fourth lens group is moved along a trajectory convex toward the object side, and
the zoom lens satisfies the following inequalities:

$$\nu d1\text{ave} > 68.2, \text{ and}$$

$$Nd1\text{ave} > 1.53$$

where $\nu d1$ave is the average of Abbe numbers of positive lenses belonging to the first lens group, and $Nd1$ave is the average of refractive indexes of the positive lenses belonging to the first lens group.

2. A zoom lens comprising:
a first lens group having a positive refractive power;
a second lens group having a negative refractive power;
a third lens group having a positive refractive power; and
a fourth lens group having a positive refractive power,
wherein the first lens group, the second lens group, the third lens group, and the fourth lens group are sequentially arranged from an object side to an image surface side,
while zooming from a wide-angle position to a telephoto position, the first lens group is moved in such a way that the distance between the first lens group and the second lens group is widened, the second lens group is moved along a trajectory convex toward the image surface side, the third lens group is moved from the image surface side to the object side, and the fourth lens group is moved along a trajectory convex toward the object side, and
the zoom lens satisfies the following inequalities:

$$\nu d1\text{ave} > 68.2, \text{ and}$$

$$Nd1\text{ave} > 1.53$$

where $\nu d1$ave is the average of Abbe numbers of positive lenses belonging to the first lens group, and $Nd1$ave is the average of refractive indexes of the positive lenses belonging to the first lens group, and
wherein the zoom lens further satisfies the following inequality:

$$0.85 < |\beta 2T| < 1.5$$

where $\beta 2T$ is the magnification ratio of the second lens group at the telephoto position.

3. A zoom lens comprising:
a first lens group having a positive refractive power;
a second lens group having a negative refractive power;
a third lens group having a positive refractive power; and
a fourth lens group having a positive refractive power,
wherein the first lens group, the second lens group, the third lens group, and the fourth lens group are sequentially arranged from an object side to an image surface side,
while zooming from a wide-angle position to a telephoto position, the first lens group is moved in such a way that the distance between the first lens group and the second lens group is widened, the second lens group is moved along a trajectory convex toward the image surface side, the third lens group is moved from the image surface side to the object side, and the fourth lens group is moved along a trajectory convex toward the object side, and
the zoom lens satisfies the following inequalities:

$$\nu d1\text{ave} > 68.2, \text{ and}$$

$$Nd1\text{ave} > 1.53$$

where $\nu d1$ave is the average of Abbe numbers of positive lenses belonging to the first lens group, and $Nd1$ave is the average of refractive indexes of the positive lenses belonging to the first lens group, and
wherein the zoom lens further satisfies the following inequality:

$$6.3 < fl/fw < 9.15$$

where fl is the focal length of the first lens group and fw is the focal length of the zoom lens at the wide-angle position.

4. A zoom lens comprising:
a first lens group having a positive refractive power;
a second lens group having a negative refractive power;
a third lens group having a positive refractive power; and
a fourth lens group having a positive refractive power,
wherein the first lens group, the second lens group, the third lens group, and the fourth lens group are sequentially arranged from an object side to an image surface side,
while zooming from a wide-angle position to a telephoto position, the first lens group is moved in such a way that the distance between the first lens group and the second lens group is widened, the second lens group is moved along a trajectory convex toward the image surface side, the third lens group is moved from the image surface side to the object side, and the fourth lens group is moved along a trajectory convex toward the object side, and
the zoom lens satisfies the following inequalities:

$$\nu d1\text{ave} > 68.2, \text{ and}$$

$$Nd1\text{ave} > 1.53$$

where $\nu d1$ave is the average of Abbe numbers of positive lenses belonging to the first lens group, and $Nd1$ave is the average of refractive indexes of the positive lenses belonging to the first lens group, and
wherein the zoom lens further satisfies the following inequality:

$$0.32 < \beta 234T/fw < 0.5$$

where $\beta 234T$ is the combined magnification ratio of the second lens group, the third lens group, and the fourth lens group at the telephoto position, and fw is the focal length of the zoom lens at the wide-angle position.

5. The zoom lens of claim 1, wherein the first lens group comprises less than four lenses and comprises at least one negative lens and at least one positive lens.

6. A zoom lens comprising:
a first lens group having a positive refractive power;
a second lens group having a negative refractive power;
a third lens group having a positive refractive power; and
a fourth lens group having a positive refractive power,
wherein the first lens group, the second lens group, the third lens group, and the fourth lens group are sequentially arranged from an object side to an image surface side,
while zooming from a wide-angle position to a telephoto position, the first lens group is moved in such a way that the distance between the first lens group and the second lens group is widened, the second lens group is moved along a trajectory convex toward the image surface side, the third lens group is moved from the image surface side to the object side, and the fourth lens group is moved along a trajectory convex toward the object side, and the zoom lens satisfies the following inequalities:

$\nu d1\text{ave} > 68.2$, and $Nd1\text{ave} > 1.53$ where vd1ave is the average of Abbe numbers of positive lenses belonging to the first lens group, and Nd1ave is the average of refractive indexes of the positive lenses belonging to the first lens group, and wherein the first lens group and the third lens group satisfy the following inequality:

$|\nu d1\text{ave} - \nu d3\text{ave}| < 9.0$ where vd1ave is the average of Abbe numbers of positive lenses belonging to the first lens group, and vd3ave is the average of Abbe numbers of positive lenses belonging to the third lens group.

7. The zoom lens of claim 1, wherein the third lens group comprises a positive lens having at least one aspherical surface.

8. A zoom lens comprising:

a first lens group having a positive refractive power;
a second lens group having a negative refractive power;
a third lens group having a positive refractive power; and
a fourth lens group having a positive refractive power,
wherein the first lens group, the second lens group, the third lens group, and the fourth lens group are sequentially arranged from an object side to an image surface side, while zooming from a wide-angle position to a telephoto position, the first lens group is moved in such a way that the distance between the first lens group and the second lens group is widened, the second lens group is moved along a trajectory convex toward the image surface side, the third lens group is moved from the image surface side to the object side, and the fourth lens group is moved along a trajectory convex toward the object side, and the zoom lens satisfies the following inequalities:

$\nu d1\text{ave} > 68.2$, and $Nd1\text{ave} > 1.53$ where vd1ave is the average of Abbe numbers of positive lenses belonging to the first lens group, and Nd1ave is the average of refractive indexes of the positive lenses belonging to the first lens group, and wherein the zoom lens satisfies the following inequality:

$\beta 4T > 0.6$ where β4T is the magnification ratio of the fourth lens group at the telephoto position.

9. The zoom lens of claim 1, wherein the third lens group comprises a front group having a positive refractive power and a rear group having a negative refractive power, and the front group and the rear group are spaced apart from each other by an air gap.

10. A zoom lens comprising:

a first lens group having a positive refractive power;
a second lens group having a negative refractive power; and
a third lens group having a positive refractive power,
wherein the first lens group, the second lens group, and the third lens group are sequentially arranged from an object side to an image surface side, while zooming from a wide-angle position to a telephoto position, the first lens group is moved in such a way that the distance between the first lens group and the second lens group is widened, the second lens group is moved along a trajectory convex toward the image surface side, and the third lens group is moved from the image surface side to the object side, and the zoom lens satisfies the following inequalities:

$\nu d1\text{ave} > 68.2$, $Nd1\text{ave} > 1.53$, $0.85 < |\beta 2T| < 1.5$, $|\nu d1\text{ave} - \nu d3\text{ave}| < 9.0$, and $ft/fw > 11$ where vd1ave is the average of Abbe numbers of positive lenses belonging to the first lens group, vd3ave is the average of Abbe numbers of positive lenses belonging to the third lens group, Nd1ave is the average of refractive indexes of the positive lenses belonging to the first lens group, β2T is the magnification ratio of the second lens group at the telephoto position, ft is the focal length of the zoom lens at the telephoto position, and fw is the focal length of the zoom lens at the wide-angle position.

11. The zoom lens of claim 10, wherein the first lens group comprises less than four lenses and comprises at least one negative lens and at least one positive lens.

12. The zoom lens of claim 10, wherein a fourth lens group having a positive refractive power is disposed on the image surface side of the third lens group, and the fourth lens group is moved along a trajectory convex toward the object side while zooming from the wide-angle position to the telephoto position.

13. The zoom lens of claim 10, wherein the zoom lens further comprises a fourth lens group having a positive refractive power is disposed on the image surface side of the third lens group and further satisfies the following inequality:

$\beta 4T > 0.6$ where β4T is the magnification ratio of the fourth lens group at the telephoto position.

14. The zoom lens of claim 10, wherein the third lens group comprises a front group having a positive refractive power and a rear group having a negative refractive power, and the front group and the rear group are spaced apart from each other by an air gap.

15. A zoom lens comprising:

a first lens group having a positive refractive power;
a second lens group having a negative refractive power;
a third lens group having a positive refractive power; and
a fourth lens group having a positive refractive power,
wherein the first lens group, the second lens group, the third lens group, and the fourth lens group are sequentially arranged from an object side to an image surface side, while zooming from a wide-angle position to a telephoto position, the first lens group is moved in such a way that the distance between the first lens group and the second lens group is widened, the second lens group is moved along a trajectory convex toward the image surface side, the third lens group is moved from the image surface side to the object side, and the fourth lens group is moved along a trajectory convex toward the object side, and the zoom lens satisfies the following inequalities:

$$\nu d1\text{ave} > 68.2,$$

$$Nd1\text{ave} > 1.53, \text{ and}$$

$$0.32 < \beta 234T/fw < 0.5$$

where νd1ave is the average of Abbe numbers of positive lenses belonging to the first lens group, Nd1ave is the average of refractive indexes of the positive lenses belonging to the first lens group, β234T is the combined magnification ratio of the second lens group, the third lens group, and the fourth lens group, at the telephoto position, and fw is a focal length of the zoom lens at the wide-angle position.

16. The zoom lens of claim 15, wherein the first lens group comprises less than four lenses and comprises at least one negative lens and at least one positive lens.

17. The zoom lens of claim 15, wherein the first lens group and the third lens group satisfy the following inequality:

$$|\nu d1\text{ave} - \nu d3\text{ave}| < 9.0$$

where νd1ave is the average of the Abbe numbers of the positive lenses belonging to the first lens group, and νd3ave is the average of Abbe numbers of positive lenses belonging to the third lens group.

18. The zoom lens of claim 15, wherein a fourth lens group having a positive refractive power is disposed on the image surface side of the third lens group, and the fourth lens group is moved along a trajectory convex toward the object side while zooming from the wide-angle position to the telephoto position.

19. The zoom lens of claim 15, wherein the zoom lens further satisfies the following inequality:

$$\mu 4T > 0.6$$

where β4T is the magnification ratio of the fourth lens group at the telephoto end.

20. The zoom lens of claim 15, wherein the third lens group comprises a front group having a positive refractive power and a rear group having a negative refractive power, and the front group and the rear group are spaced apart from each other by an air gap.

21. An imaging apparatus comprising:
the zoom lens of claim 1; and
an imaging device that generates an image of a subject using light entering through the zoom lens.

* * * * *